(12) United States Patent
Fries

(10) Patent No.: US 7,401,348 B2
(45) Date of Patent: *Jul. 15, 2008

(54) TELEVISION TUNING DEVICE SCREEN SAVER ADVERTISING

(75) Inventor: Robert M Fries, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 476 days.

This patent is subject to a terminal disclaimer.

(21) Appl. No.: 11/248,341

(22) Filed: Oct. 12, 2005

(65) Prior Publication Data

US 2006/0117366 A1 Jun. 1, 2006

Related U.S. Application Data

(63) Continuation of application No. 09/681,154, filed on Jan. 31, 2001, now Pat. No. 6,973,664.

(51) Int. Cl.
G06F 3/00 (2006.01)
G06F 13/00 (2006.01)
H04N 5/445 (2006.01)
H04N 7/10 (2006.01)
H04N 7/025 (2006.01)
H04N 7/173 (2006.01)
H04N 7/16 (2006.01)

(52) U.S. Cl. .................. 725/42; 725/32; 725/131; 725/139; 725/151

(58) Field of Classification Search .............. 725/42, 725/32, 131, 139, 151
See application file for complete search history.

(56) References Cited

U.S. PATENT DOCUMENTS

| 5,781,228 | A | * | 7/1998 | Sposato | 725/32 |
| 6,084,583 | A | * | 7/2000 | Gerszberg et al. | 715/867 |
| 6,141,006 | A | * | 10/2000 | Knowlton et al. | 705/26 |
| 6,177,931 | B1 | * | 1/2001 | Alexander et al. | 725/52 |
| 6,557,756 | B1 | * | 5/2003 | Smith | 235/379 |
| 6,622,304 | B1 | * | 9/2003 | Carhart | 725/74 |

* cited by examiner

Primary Examiner—Chris Kelley
Assistant Examiner—Joseph G Ustaris
(74) Attorney, Agent, or Firm—Workman Nydegger

(57) ABSTRACT

Television tuning device screen saver advertising is disclosed. The television tuning device that is connectable to the Internet. While the user has his or her device connected to the Internet, advertising information may be cached. When the device enters a screen saver mode, the previously cached information is displayed. The advertising information can be targeted to the user based on demographic and other information, and can be interactive. The advertising information may also cause the device to tune to a particular channel related to the advertising information, such that both are displayed. The advertising information is unrelated to any sponsor of the television tuning device.

13 Claims, 5 Drawing Sheets

TELEVISION TUNING DEVICE SCREEN SAVER ADVERTISING

CROSS REFERENCE TO RELATED APPLICATIONS

This application is a continuation of application Ser. No. 09/681,154, filed Jan. 31, 2001, and entitled "TELEVISION TUNING DEVICE SCREEN SAVER ADVERTISING" and which is incorporated here by reference.

FIELD OF THE INVENTION

This invention relates generally to screen saver programs, and more particularly to displaying advertising on screen saver programs in conjunction with a television tuning device.

BACKGROUND OF THE INVENTION

The convergence of television and computers in the realm of the Internet has resulted in the increasing popularity of devices that are able to provide access to the Internet, as well as allow viewing of television channels. The first such devices had two distinct modes, an Internet mode and a television mode. In the Internet mode, a user accesses the Internet similar to the way that he or should would on a stand-alone computer. For example, the user may browse web sites on the world-wide web ("the web"), send and receive email, and perform other tasks. In the television mode, the user views television channels similar to the way that he or she would on a television without Internet capability. Next-generation convergence devices, however, portend the integration of these two modes. The user may be able to participate in a chat room that is related to the television program he or she is watching. The user may be able to click on the television program being viewed, and be transported on the Internet to a web site related to the program. The user may also be able to click on the television program being viewed to send an email of the producers of the program.

However, even with the advent of such next-generation convergence devices, advertisers are still constrained with advertising in conjunction with one of the two distinct modes, instead of being able to advertise in an integrated Internet and television mode. For example, advertisers can pay for traditional television ads, which are usually thirty- or sixty-second segments displayed a number at a time during interruptions of a television program. With respect to the Internet, most Internet-oriented advertising is in the form of banner ads on web pages. For example, when a user browses a particular web site, there may be one or more sections of the web pages of the site dedicated to advertising. Little or no advertising takes advantage of the convergence between television and the Internet. Furthermore, Internet-oriented advertising is typically viable only when the user is actively browsing the Internet. For these and other reasons, therefore, there is a need for the present invention.

SUMMARY OF THE INVENTION

The invention relates to displaying advertising using a screen saver program in conjunction with a television tuning device that is connectable to the Internet. While the user has his or her device connected to the Internet, advertising information may be cached, such that when the device enters a screen saver mode, the previously cached information is displayed. The advertising information can be targeted to the user based on demographic and other information of the user, and can be interactive. The advertising information may also cause the device to tune to a particular channel related to the advertising information, such that both are displayed. The advertising information is unrelated to any sponsor of the television tuning device. For example, the advertising information does not include promotional information for the sponsor's brand of the television tuning device.

The invention includes methods and computer-readable media of varying scope. Other aspects and embodiments of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the present invention is defined only by the appended claims.

Example Television Tuning Device Environment

Figure 1:
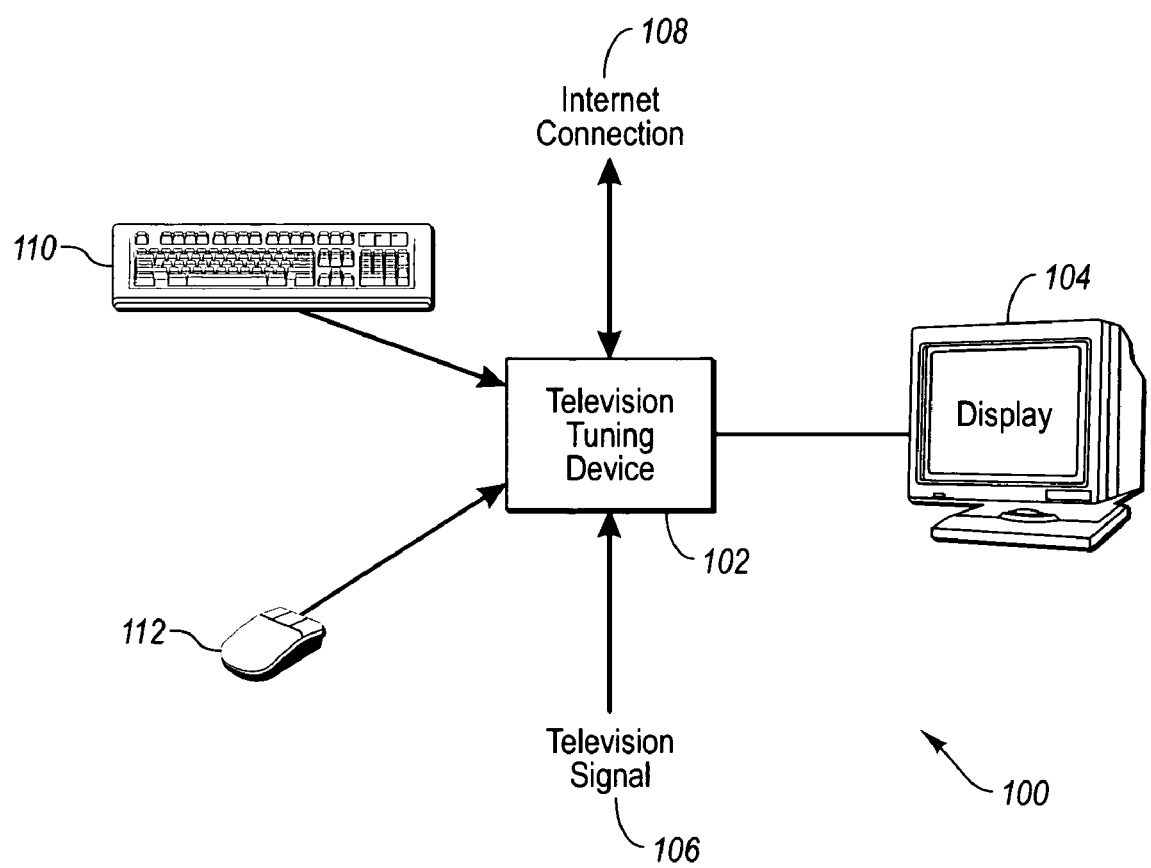
FIG. 1 is a diagram of an example television tuning device environment in conjunction with which embodiments of the invention may be practiced.

FIG. 1 is a typical television tuning device environment 100 in conjunction with which the invention may be practiced. Within the environment 100 there is a television tuning device 102 and a display 104. As used in the invention, a television tuning device is a device that is able to translate an incoming signal 106 into a picture, typically with accompanying sound, for viewing on a TV screen or other display 104. Such a device may be integrated into a TV itself, where such a TV may receive Very High Frequency (VHF) channels, Ultra High Frequency (UHF) channels, and cable TV channels (such that the TV is "cable ready"). The device 102 may be a set-top box that is situated between the TV or other display 104 and the signal 106. The device 102 may be a general purpose computer having software and/or hardware running thereon to translate the incoming signal 106 for viewing on a TV or other display 104. The display 104 is a display on which the picture generated by the device 102 is shown, and can be a television, a computer monitor, a cathode ray tube (CRT) device, a flat-panel display (FPD) device, or another type of device.

The incoming signal 106 can be received in a variety of different manners, such as via cable TV (CATV), an off-air antenna for traditional TV stations, a Digital Satellite System (DSS) satellite, a digital TV signal (DTV), or over a network. The network, for example, may be one or more of a local-area network (LAN), a wide-area network (WAN), an intranet, an extranet, and the Internet. The DTV signal may be a standard definition TV signal (SDTV), a high definition TV (HDTV) signal, or another type of signal. There may be interstitial devices between the television tuning device 102 and the display 104, which are not particularly called out in FIG. 1. For example, a line doubler may be present to convert an interlaced output from the television tuning device 102 into a progressive input for the display 104.

The television tuning device 102 has Internet capability. As shown in FIG. 1, the Internet capability is represented by an Internet connection 108. The Internet connection 108 may be a two-way connection, allowing the user to both send and receive data over the Internet. For example, the user may be able to surf web sites, send and receive email, participate in chat groups, and perform other tasks. The Internet connection 108 may also be a one-way connection, where the user has no particular control over the data received over the Internet connection 108. For example, the data may be advertising information related to the current programming on the television channels to which the television tuning device 102.

As such, the Internet connection 108 may be a separate connection from the television signal 106, or integrated with the television signal 106. For example, the Internet connection 108 may occur through a network adapter connected to a network, a modem connected to an analog phone line, or an Integrated Services Digital Network (ISDN) adapter connected to an ISDN line. Further examples include a Digital Subscriber Loop (DSL) modem connected to a phone line, and a cable modem connected to a cable. The Internet connection 108, where it is a one-way connection, may occur within the signal 106 itself, such that Internet-related or other data is transmitted in-band or out-of-band relative to the signal 106, or within the vertical blanking interrupt (VBI) of the signal 106. For example, the Internet-related or other data may be advertising information.

The television tuning device 102 is associated with one or more sponsors. These sponsors can include the provider of the television signal that is received over the television signal 106. For example, the provider may be a cable provider, or a digital satellite service provider. The sponsors can also include the manufacturer of either the hardware or the software of the television tuning device 102. Another sponsor can be the Internet Service Provider (ISP) providing the Internet connection 108. A sponsor generally is a party that has a degree of direct control over the television tuning device 102, other than the end user. The television signal provider directly controls the television signal 106 input into the device 102, while the hardware and software manufacturers of the device 102 directly control how the device 102 is constructed. The ISP directly controls the Internet connection 108 that the device 102 can access. Sponsors do not include, however, networks that provide channels tunable by the television tuning device 102, nor advertisers that advertise on programs displayed on these channels, unless the networks and advertisers are also television signal providers, ISP's, and/or hardware or software manufacturers of the device 102.

The television tuning device 102 is managed by a party other than the user. For example, the operating of the screen saver program, which is a part of the device 102, may be under the control of the sponsor, and not under the control of the user. This means that the user cannot directly modify the software by which the television tuning device 102 is programmed. The party is typically one or more of the sponsors associated with the device 102. The user may be able to pay for additional software functionality, or upgrade the software of the device 102. Without the authorization of another party, however, the user is unable to add this additional functionality or otherwise upgrade the software of the device 102. That is, ultimately the device 102 is under the control of a party other than the user. This is in distinction to a standard general purpose computer, in which the user can install and uninstall new software limited only by the hardware limitations of the computer. Conversely, the television tuning device 102 can have new software installed and uninstalled only as authorized and allowed by another party. Whereas a standard general purpose computer is an open system in this respect, the device 102 by comparison is a closed system. However, a general purpose computer can be converted into a television tuning device with appropriate hardware and software that transform the computer into a closed system.

The television tuning device 102 is operatively coupled to one or more input devices, to allow the user to interact with its Internet capability. In FIG. 1, two particular input devices are shown, a keyboard 110, and a mouse 112. The keyboard 110 allows the user to provide text input into the device 102, while the mouse 112, or other type of pointing device, allows the user to navigate a cursor displayed by the device 102 on the display 104. The functionality of the keyboard 110 and the mouse 112 can also be integrated into a single input device. The input devices may be operatively coupled to the television tuning device 102 in that cables connect them to the device 102. Alternatively, the input devices may communicate with the television tuning device 102 in a wireless manner.

Advertising Information on a Screen Saver

The manner by which advertising information is displayed using a screen saver program in conjunction with varying embodiments of the invention is now described. The invention is performed in conjunction with the television tuning device environment 100 of FIG. 1 described in the previous section of the detailed description. As used herein, a screen saver program refers to software that in response to satisfaction of a first predetermined condition, such as a specified duration of time without keyboard 110, mouse 112, or other input device input, the program displays information on the display 104. Satisfaction of a subsequent second predetermined condition, such as the user pressing a key on the keyboard 110 or moving the mouse 112, restores the display 104 to its previous contents. Embodiments of the invention display advertising information in response to satisfaction of the first predetermined condition, until the second predetermined condition has been satisfied.

Figure 2:
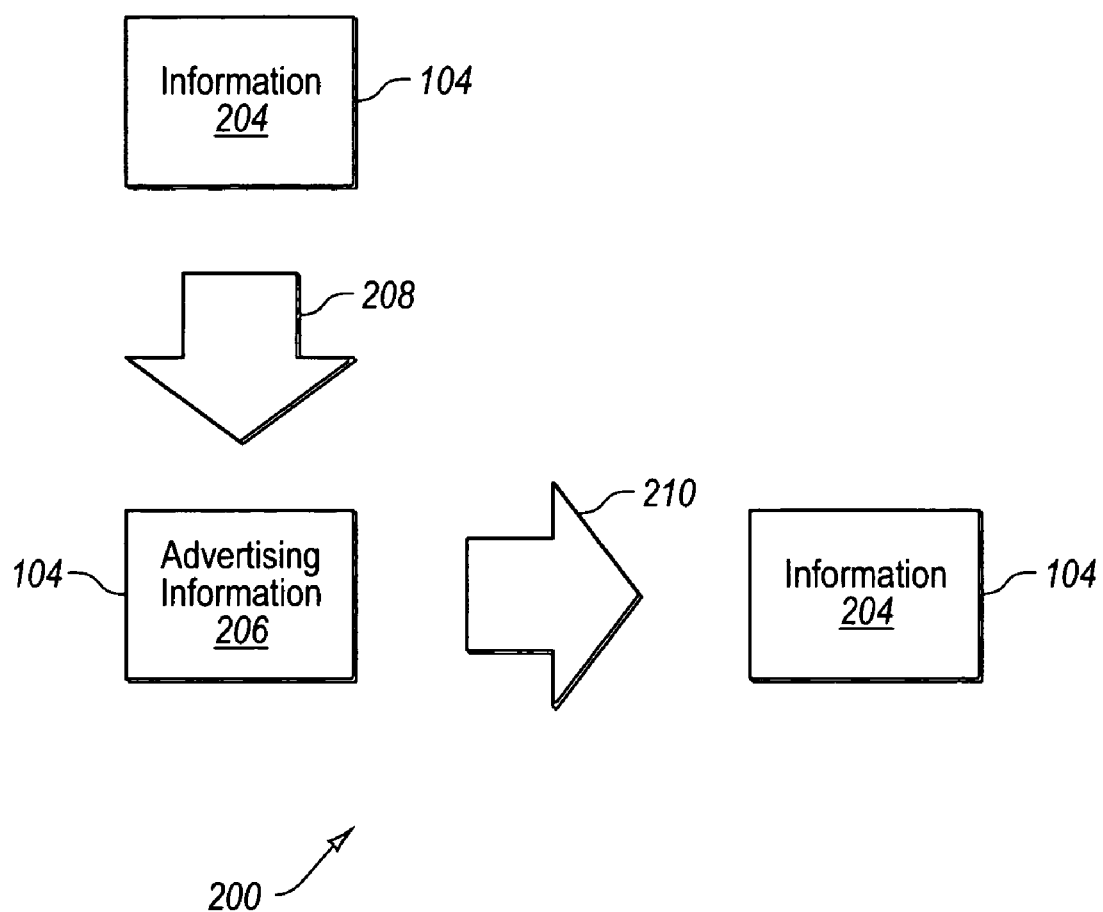
FIGS. 2-4 are diagrams of example screen savers according to varying embodiments of the invention.

This is shown by reference to FIG. 2, which is a diagram 200 illustrating an embodiment of the invention. The display 104 initially shows information 204. However, after a first predetermined condition has been satisfied, such as a predetermined length of time having elapsed in which there has been no user activity on any input device, as represented by the arrow 208, the information 204 on the display 104 is replaced by the advertising information 206. This is referred to as the televising tuning device having entered a screen saver mode. The advertising information is unrelated to any of the sponsors of the television tuning device. The advertising information may be Internet-related data, or another type of data. Once a second predetermined condition has been satisfied, such as user activity being detected on any input device, as represented by the arrow 210, the information 204 is again displayed on the display 104, replacing the advertising information 206. This is referred to as the television tuning device having exited the screen saver mode.

The television tuning device may not always be connected to the Internet or other network over which it can receive the advertising information 206 displayed on the display 104. In such instances, when the device is in fact connected to the Internet or other network over which it can receive the advertising information 206, it caches the information 206. When the screen saver mode is entered, the information 206 that has been cached is displayed on the display 104.

The advertising information 206 can be dynamically programmable, such that it is developed or otherwise created by or for a particular advertiser in a predetermined markup language, such as HyperText Markup Language (HTML). That is, rather than the information 206 being a static or moving image or images, the use of a markup language enables the advertising information 206 to be programmed, such as one or more web pages of a web site for the advertiser may have been programmed. This provides the advertiser with a greater degree of control over the design of the advertising information 206.

The advertising information 206 displayed on the display 104 can be selected based on information of the user of the television tuning device 102. For example, web site browsing activity, demographic information, and other information of the user can be used to determine a best ad for display on the display 104, such as an ad that is most likely to elicit a response by the user. This can be accomplished by collaborative filtering, statistical models, Bayesian networks, and other approaches known within the art.

The advertising information 206 displayed on the display 104 can also be interactive. This is as opposed to passive information, with which the user cannot interact, but which is merely displayed to the user. Interactive information can, for example, enable the user to obtain more information regarding a product or service being advertised, go to the web site of the advertiser, or otherwise interact. This embodiment of the invention can be utilized in conjunction with the embodiment in which the advertising information is coded in a markup language. The advertising information being displayed in the screen saver mode is in effect a web site that displays a home page. The user is able to browse the other pages of the web site by interacting with the advertising information.

Figure 3:
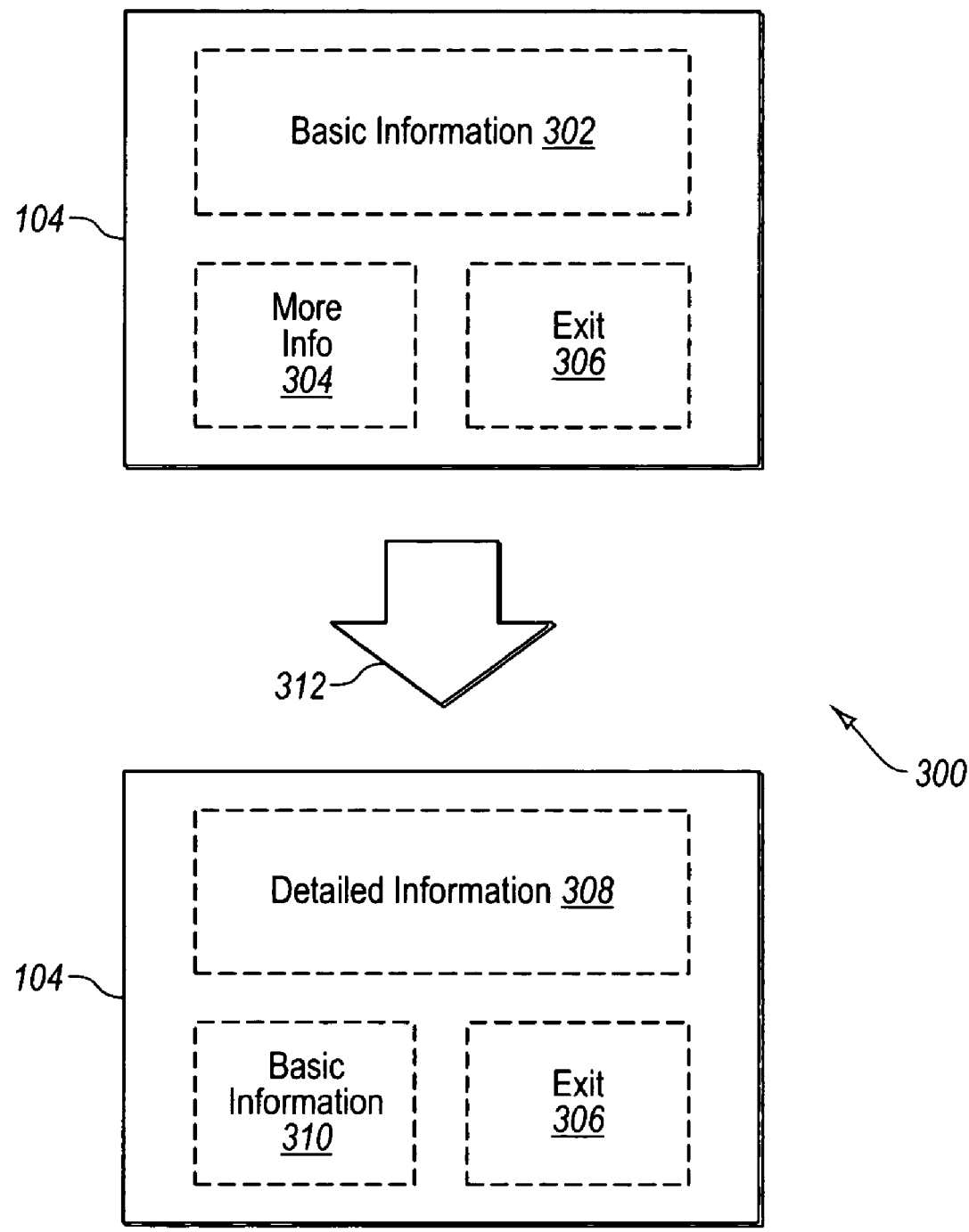

An example of an interactive screen saver is shown in the diagram 300 of FIG. 3, although it is noted that the invention is not particularly limited to this example.

The display 104 is in the screen saver mode, on which basic advertising information 302 is displayed, along with a more information segment 304 (which is generally referred to as an interactive segment), and an exit segment 306. If the user viewing the display 104 is interested in learning more about the basic advertising information 302, he or she can select the more information segment 304. User selection may occur by using an input device to, for example, move a cursor such as a pointer over the segment 304 and actuate a button of the input device.

In response to this user input device activity in specific relation to the segment 304, as represented by the arrow 312 in FIG. 3, more detailed advertising information 308 is displayed on the display 104. The interactive segment has turned into a basic information segment 310, such that user selection thereof causes the basic information 302 to be displayed again. User selection of the exit segment 306—that is, user input device activity in specific relation to the exit segment 306—causes exiting the screen saver mode. It is noted that the presence of an exit segment 306 is desirable. This is because the general predetermined condition which causes exiting the screen saver mode—the detection of user input device activity—cannot usually be used in the interactive screen saver. The input device activity must be utilized to allow user interaction with the screen saver.

The screen saver mode can cause tuning to and displaying of a particular channel in conjunction with the advertising information being displayed. For example, an all-news channel can be tuned to and displayed, along with advertising information regarding this channel. As another example, if a particular situation comedy ("sitcom") program is currently on an entertainment channel being tuned to and displayed, the advertising information can be particular to this sitcom program.

Figure 4:
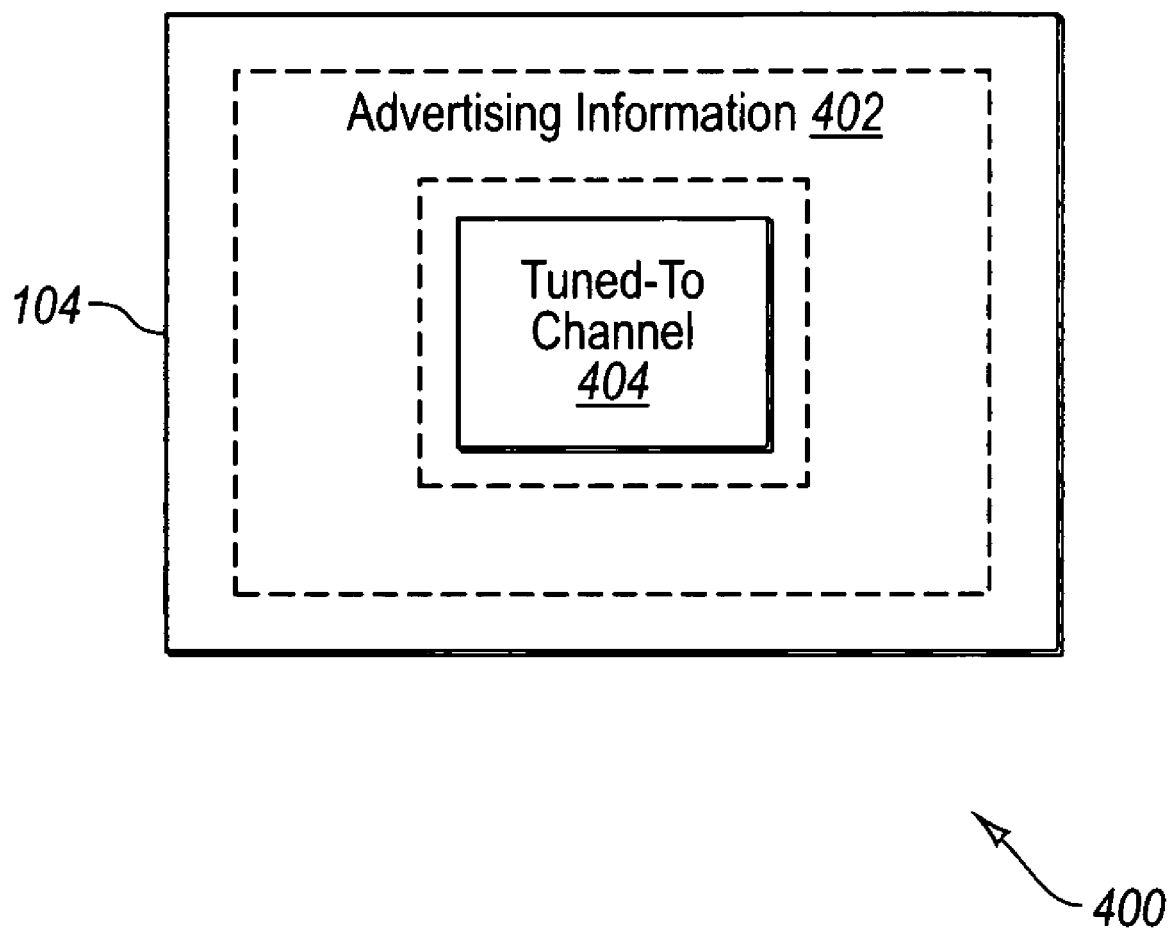

An example of this embodiment of the invention is shown in the diagram 400 of FIG. 4. In the center of the display 104, there is an area 404 in which a tuned-to channel is displayed. Surrounding this area 404 is the advertising information 402. As has been noted, the advertising information 402 can be information regarding the channel tuned to and displayed in the area 404, or can be information regarding the particular program currently on this channel. In this manner, a screen saver utilizes other functionality of the television tuning device 102.

Methods

In this section of the detailed description, methods according to varying embodiments of the invention are described. The methods are performed by the television tuning device 102 of FIG. 1. The methods can be realized at least in part as one or more programs running on the television tuning device 102, executed from a computer-readable medium such as a memory by a processor of the device 102. The programs may be storable on a computer-readable medium such as a floppy disk or a CD-ROM.

Figure 5:
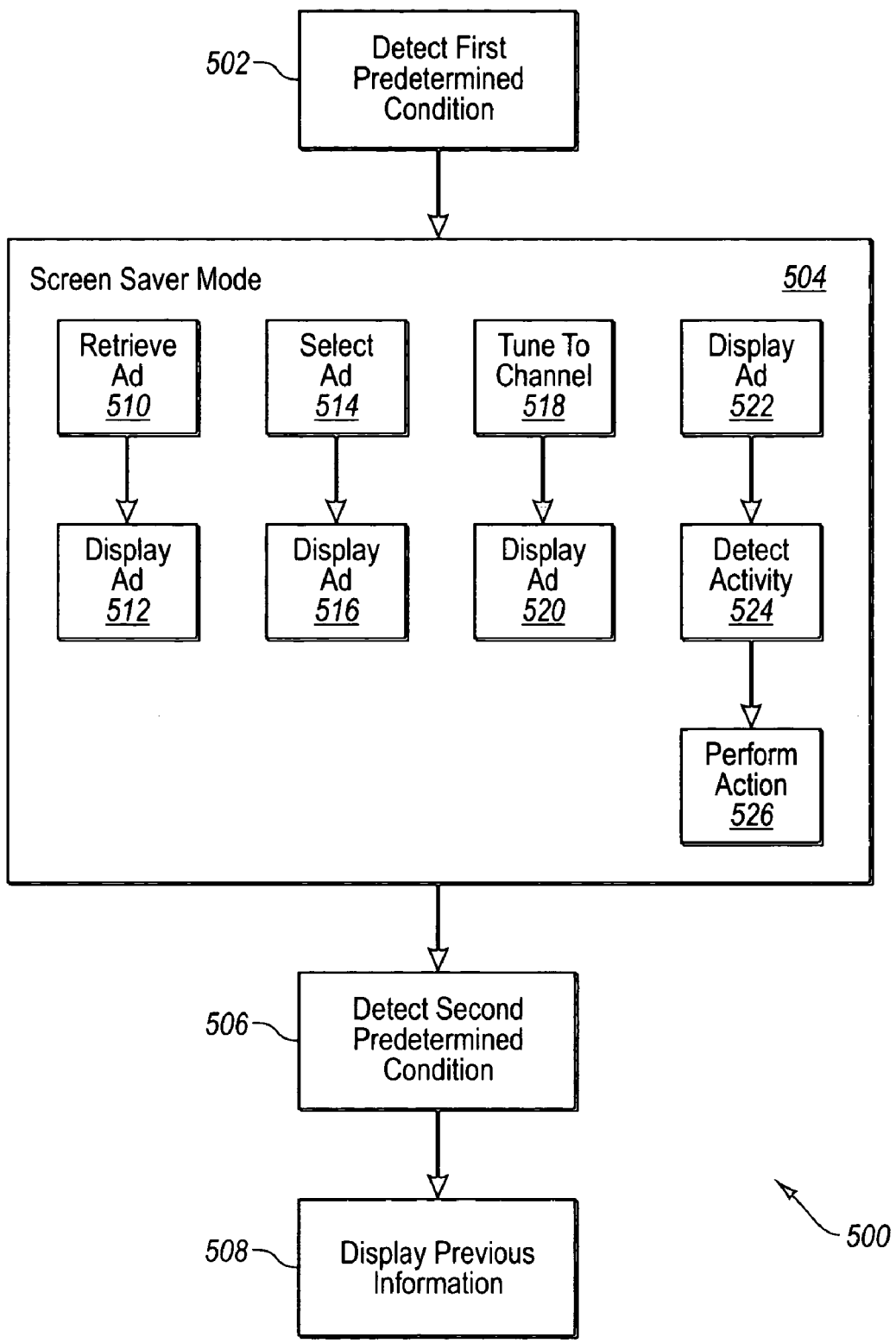
FIG. 5 is a flowchart of a method according to an embodiment of the invention.

FIG. 5 is a flowchart of a method 500 according to an embodiment of the invention. In 502, a first predetermined condition, such as the elapsing of a predetermined length of time without user activity on any input device is detected. In 504, in response to the first predetermined condition, a screen saver mode is entered, as has been described in detail in the previous sections of the detailed description. For example, advertising information is displayed on the display 104. In 506, a second predetermined condition, such as user activity on any input device, is detected. In response to the second predetermined condition, in 508, the information previously displayed on the display 104 before the advertising information was displayed in 504 is again displayed.

In one specific embodiment, the entering of the screen saver mode in 504 entails performance of 510 and 512. In 510, advertising information that was previously cached is retrieved, and then is displayed on the display 104 in 512. In another specific embodiment, the entering of the screen saver mode in 504 entails performance of 514 and 516. In 514, advertising information is selected based on information regarding the user, such as demographic and/or other information, and then is displayed on the display 104 in 516. In another specific embodiment, the entering of the screen saver mode in 504 entails performance of 518 and 520. In 518, a particular channel to which the advertising information is related is tuned to and displayed, and then the advertising information is display 104ed in 520.

In another specific embodiment, the entering of the screen saver mode in 504 entails performance of 522, 524 and 526. In 522, basic advertising information is displayed, along with, for example, an interactive segment. User input device activity in relation to the interactive segment is detected in 524, such that in response thereto, an action is performed in 526. For example, as has been described, the action can include the display 104 of more detailed advertising information on the display 104. It is noted that the specific embodiments described as can be performed in 504 can be performed in conjunction with one another as well. For example, the interactivity of 522, 524 and 526 can be performed in conjunction with the selection of advertising information based on the user of 514 and 516.

In a final embodiment, the entering of the screen saver mode in 504 entails showing an ad that offers goods or services for immediate purchase by the user. For example, the ad displayed in 512, 516, or 520 may include information relating to a particular good or service. The user then can immediately purchase the good or service by clicking on an appropriate button on the remote control, or moving a cursor or other pointer over a displayed button within the ad, and activating the button to cause purchase.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

I claim:

1. A television tuning device that is configured to at least translate an incoming signal into a picture on a display and that is also connected to the Internet, the tuning device comprising:
   one or more computer-readable media having computer-executable instructions for implementing a method comprising:
   displaying information at the television device comprising at least one of television programming and Internet content;
   entering a screen saver mode upon detecting a first predetermined condition comprising user inactivity with one or more input devices operatively coupled to the television tuning device;
   in response to entering the screen saver mode, tuning to a particular television channel and displaying television programming from the particular television channel; and
   while in the screen saver mode, replacing the displayed information with advertising information, the advertising information being displayed with an exit segment that can be selected to exit the screen saver mode, wherein the television tuning device exits the screen saver mode in response to the exit segment being selected rather than exiting the screen saver mode in response to other user activity detected at the one or more input devices.

2. The tuning device of claim 1, wherein the method further comprises:
   detecting a second predetermined condition comprising exiting of the screen saver mode; and
   replacing the advertising information with the displayed information on the display in response to the second predetermined condition.

3. The tuning device of claim 1, wherein the advertising information comprises an offering for sale of at least one of a good and a service, such that the user is able to immediately purchase the at least one of the good and the service.

4. The tuning device of claim 1, wherein replacing displayed information on the display with the advertising information comprises retrieving the advertising information as previously cached.

5. The tuning device of claim 4, wherein the method further comprising caching the advertising information.

6. The tuning device of claim 5, wherein the advertising information is cached as downloaded from the Internet.

7. The tuning device of claim 1, wherein the method further comprises displaying second advertising information on the display.

8. The tuning device of claim 1, wherein the advertising information has been provided by an advertiser, and is written in a predetermined markup language.

9. The tuning device of claim 8, wherein the predetermined markup language comprises HyperText Markup Language (HTML).

10. The tuning device of claim 1, wherein the displayed information on the display comprises a tuned-to television channel, and replacing the displayed information on the display with the advertising information comprises tuning to a different television channel related to the advertising information being displayed.

11. The tuning device of claim 1, wherein replacing the displayed information on the display with the advertising information comprises selecting the advertising information based on information particular to a user.

12. The tuning device as recited in claim 1, wherein the television programming is displayed simultaneously with advertising.

13. The tuning device as recited in claim 12, wherein the advertising corresponds to the television programming the advertising is being displayed with.

* * * * *